US005200094A

United States Patent [19]

Hill et al.

[11] Patent Number: 5,200,094

[45] Date of Patent: Apr. 6, 1993

[54] METHOD OF RECOVERY OF PRINTING INK WASTES USING ELEVATED TEMPERATURE, PRESSURE AND SHEAR

[75] Inventors: Alan M. Hill, Topeka; Michael D. Cain; Donald D. Cain, both of Lawrence, all of Kans.

[73] Assignee: Lawrence Paper Company, Lawrence, Kans.

[21] Appl. No.: 899,090

[22] Filed: Jun. 15, 1992

Related U.S. Application Data

[63] Continuation-in-part of Ser. No. 811,183, Dec. 20, 1991, abandoned.

[51] Int. Cl.[5] .......................... B01D 1/14; B41F 31/20

[52] U.S. Cl. .......................................... 210/768; 34/12; 34/14; 34/33; 101/491; 106/20 A; 210/769; 210/771; 210/774; 210/806; 210/808

[58] Field of Search ............. 106/20 A; 101/483, 491, 101/494; 210/768, 770, 774, 790, 806, 917, 769, 767, 780, 771, 808; 34/14, 12, 22, 33

[56] References Cited

U.S. PATENT DOCUMENTS

| | | | |
|---|---|---|---|
| 74,878 | 2/1868 | Baker | 106/20 A |
| 181,597 | 8/1876 | Robertson | 106/20 A |
| 4,391,638 | 7/1983 | Fuscoetal | 210/774 |
| 4,565,638 | 1/1986 | Zucker | 210/774 |
| 4,738,785 | 4/1988 | Langston et al. | 210/917 |
| 4,874,515 | 10/1989 | McKelvey | 106/20 A |

*Primary Examiner*—Joseph W. Drodge

*Attorney, Agent, or Firm*—Hovey, Williams, Timmons & Collins

[57] ABSTRACT

A method for recovery of printing ink wastes is provided which greatly minimizes pollution problems attendant to the disposal of ink wastes, while permitting formulation of usable ink products from the wastes. The method involves first creating a flowable stream of material including the ink wastes, and directing this stream to a hydroheater (16) along with incoming steam. In the hydroheater (16), the ink wastes are subjected to elevated temperatures and pressures, and intense shear, creating a homogeneous, flowable output. This output may then be dried and powdered, and the powder may be reconstituted as a black ink suitable for commercial printing operations. If desired, the hydroheater (16) output may be treated in a filter press (252) to obtain a filter cake (258), and this cake (258) may be subsequently subdivided and treated with ink carriers to form a processing ink.

16 Claims, 3 Drawing Sheets

METHOD OF RECOVERY OF PRINTING INK WASTES USING ELEVATED TEMPERATURE, PRESSURE AND SHEAR

RELATED APPLICATION

This is a continuation-in-part of identically titled application Ser. No. 07/811,183, filed Dec. 20, 1991, now abandoned.

BACKGROUND OF THE INVENTION

1. Field of the Invention

The present invention is broadly concerned with a method for the recovery of aqueous and organic solvent-based printing ink wastes, which are generated in considerable volume in commercial printing operations, in order to greatly minimize the environmental problems attendant to treatment and disposal of such wastes. More particularly, it is concerned with such a method of ink waste recovery wherein waste ink sludge is first rendered flowable and then directed into a hydroheater simultaneously with high pressure steam, in order to subject the ink wastes to conditions of elevated temperature, pressure and intense shear, and thus create a processed output. This output can then be dried and powdered, and the resultant product can be used in the formulation of ink for reuse. Alternately, the hydroheater output may be passed through a filter press to yield a pressed cake, which can subsequently be dispersed and formulated as an ink.

2. Description of the Prior Art

Operators of printing equipment must periodically clean the inking assemblies associated with such equipment, either at the end of a shift or when a new printing run is to be set up and made ready. Ink assembly cleaning typically involves spraying the inking assembly with water and/or other appropriate solvents which is thereafter collected as ink waste. Wastes of this character include relatively large volumes of water, together with pigment particles and ink carriers.

Increasingly stringent environmental regulations prohibit direct disposal of ink wastes. Accordingly, it is common practice to treat such washup wastes with cationic and/or anionic polymers as necessary, so that the solids fraction of the ink wastes may be readily separated. The solids fraction is then allowed to drain for periods on the order of twenty-four hours, thereby forming a sludge normally containing 10–20% solids therein, and including ink solids, surfactants, the previously employed separation polymers, and varnishes.

Despite these steps, however, disposal of ink sludges presents significant problems. In some locales, the sludges may be placed in a landfill, although this option is becoming both expensive and of limited viability. Another approach is to subject the sludges to pyrolytic destruction. Although pyrolytic treatment is effective, it is a very expensive proposition, both from the standpoints of fuel consumption and shipping to the destruction site.

As a consequence of these intractable problems, printers both large and small are increasingly concerned about the costs associated with lawful disposal of their printing ink wastes; and there is a very significant need in the art for a low cost process for recovering such ink wastes.

SUMMARY OF THE INVENTION

The present invention overcomes the problems outlined above, and provides a greatly improved technique for processing of ink wastes which yields essentially no objectionable byproducts for disposal, while at the same time allowing the valuable pigment fraction of the ink waste to be recovered and reused. Broadly speaking, the method of the invention involves the steps of first providing a flowable stream of material, including printing ink wastes, and thereafter directing this stream into a confined zone while simultaneously passing a stream of steam into the zone. The wastes are subjected to conditions of elevated temperature, pressure and intense shear in the confined zones thereby creating a processed ink waste which is passed out of the zone and preferably treating further by drying.

In typical plant operations, the ink wastes (from virtually any type of printing apparatus such as flexographic or lithographic presses) are obtained by first treating liquid printer washup material to separate out a substantial fraction of the solids and form a sludge. This is a known procedure, and involves treatment of the originally fluid washup wastes with appropriate polymeric materials to cause the washup solids to float to the top of the liquid where they can be skimmed as a sludge. Thereafter, the wet sludge is placed in a receptacle lined with filter paper and allowed to drain for a period of, e.g., twenty-four hours. The result is a solid sludge containing from about 10–20% solids, and more preferably about 11–15% solids.

As indicated previously, this sludge has presented severe disposal problems for printers. In accordance with the present invention, however, the sludge product is first rendered flowable and then subjected to superatmospheric shear processing within a confined zone. Preferably, the sludge is rendered flowable by subjecting it to stirring and recirculation, until it takes on the consistency of a "soupy" mixture. Thereafter, the flowable mixture is directed to the inlet of a hydroheater device, which also has an opposed inlet for a stream of incoming steam. Internally, the hydroheater includes structure defining an annular restricted orifice, and the incoming waste ink stream is directed through this orifice. At the same time, the stream of steam is directed to intersect the ink waste stream as it passes through the restricted orifice. In this fashion, the material within the ink waste stream is subjected to the requisite heating and shearing required for processing. In the hydroheater, the ink waste should be subjected to a temperature of at least 300° F., more preferably from about 300°–360° F., with the pressure conditions being at least about 60 psi in the zone, and more preferably from about 60–75 psi.

The output stream from the hydroheater is a smooth, homogeneous, shiny, black flowable mixture which has the appearance of thick black ink. If desired, the processor can produce high quality printing ink from this processed output, simply by removing a portion of the water content, and mixing with otherwise conventional ink carriers. In more preferred techniques, however, the hydroheater output is dried to a very low moisture level approaching "bone dry", whereupon the dried residue is reduced by ballmilling or other means to a powder having an average particle size of from about 100–400 microns. This powder can then be reconstituted with normal ink carriers to produce a desirable black ink which can be used in virtually any commercial printing equipment. In alternate procedures, the hydroheater output may be subjected to filter pressing to deliquify the flowable mixture and create a filter cake; the latter may then be subdivided and reconstituted with normal ink carriers to produce an ink.

Although the precise mechanism by which the method of the invention operates is not fully understood, it is believed important that the ink wastes are subjected to high temperature and shear conditions prior to excessive drying thereof. It is known that attempts to more fully dry ink waste sludges create a brownish, multi-color product which has a gritty, sand-like quality. This is believed to stem from retrogradation of the polymeric fraction of the ink wastes. In contrast however, where incompletely dried ink sludges are treated in accordance with the invention, retrogradation of the polymeric fraction is not allowed to occur, but rather these components are cleaved into oligimers and monomers which do not inhibit reuse of the pigments contained in the ink wastes.

DESCRIPTION OF THE PREFERRED EMBODIMENT

Figure 1:
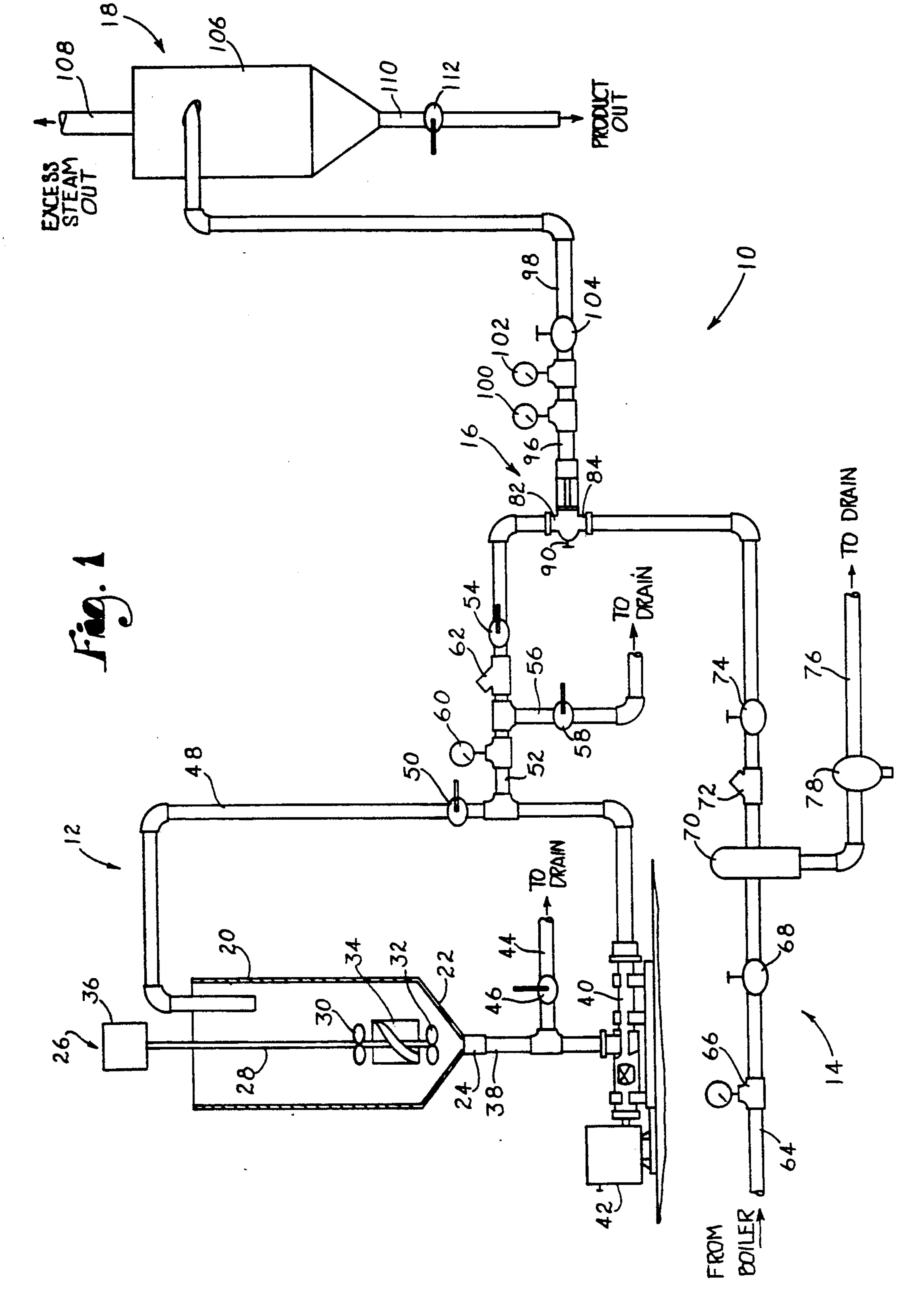
FIG. 1 is a partially schematic view illustrating the preferred processing apparatus for ink waste sludges in accordance with the invention.

Turning now to the drawings, and particularly FIG. 1, a system 10 for processing of ink wastes is illustrated. Broadly speaking, the system 10 includes a sludge liquification assembly 12, steam system 14, hydroheater 16 and downstream processing assembly 18.

In more detail, the liquification assembly 12 includes an upright, open top mixing vessel 20 presenting a frustoconical bottom 22 terminating in an outlet 24. A mixer 26 is situated within vessel 20 and includes an elongated shaft 28 equipped with a pair of spaced apart, three-bladed mixing elements 30, 32, as well as an ink mixing prop 34 between the elements 30, 32. The shaft 28 is coupled to an electric motor 36 for high speed rotation thereof.

Vessel outlet 24 is coupled to an outlet pipe 38 which leads to the input of a Moyno pump 40, the latter being driven through a motor and Reeves drive assembly 42. A drain pipe 44 equipped with a ball valve 46 is connected to the pipe 38 intermediate the ends thereof as shown.

The output of pump 40 is connected to a recirculation pipe 48 which leads back to and has an open end terminating within vessel 20. The pipe 48 is equipped with a ball valve 50, and a processing line 52 is teed from the recirculation pipe 48 upstream of the valve 50.

Processing line 52 has a control ball valve 54 therein as well as a teed drain pipe 56, controlled by ball valve 58, pressure gauge 60 and check valve 62. The end of line 52 remote from recirculation 48 is coupled to the inlet of hydroheater 16.

Steam system 14 is conventional, and includes a boiler (not shown) coupled with a steam delivery line 64. The latter has a pressure gauge 66, gate-type steam valve 68, condensate separator 70, check valve 72 and gate valve 74 therein. The delivery end of line 64 is coupled to the steam inlet of hydroheater 16 as illustrated. A drain line 76 equipped with trap 78 is coupled with the separator 70.

Figure 2:
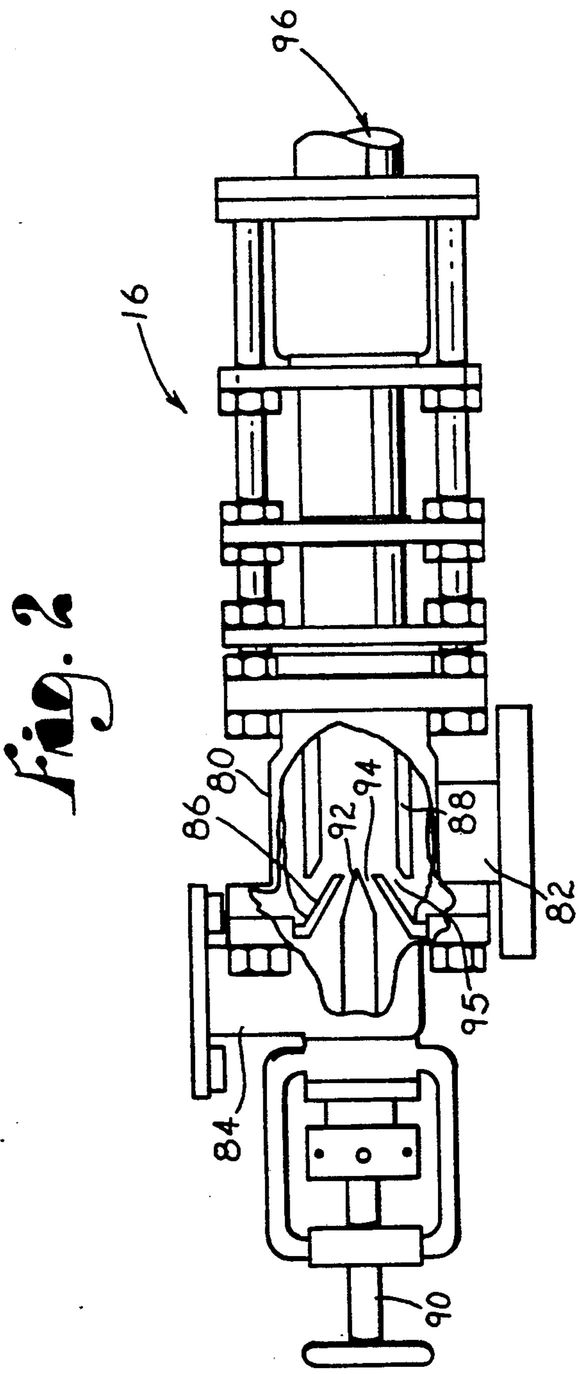
FIG. 2 is a fragmentary view with parts broken away for clarity of the reaction section of a typical hydroheater device used in processing ink waste sludges.

Referring now to FIG. 2, the hydroheater 16 is illustrated in detail. Specifically, the hydroheater 16 is in the form of an elongated tubular body or combining tube 80 presenting a tubular inlet 82 for material to be processed, and an opposed, tubular steam inlet 84. Internally, the hydroheater includes a frustoconial wall 86 together with an elongated, axially oriented and adjustable tubular wall 88. A rotatable steam needle valve 90 extends into the body 80 and has a tapered end 92 which is complemental with frustoconical wall 86. As will be perceived from a study of FIG. 2, the wall 86 and end 92 cooperatively define a steam outlet orifice 94. Also, a restricted annular orifice 95 is defined between the walls 86, 88 as depicted. It will also be evident that rotation of needle valve 90 has the effect of enlarging or restricting the dimensions of the steam orifice 94.

As is also clear from FIG. 2, tubular inlet 84 communicates with the interior of body 80 upstream of the largest diameter end of wall 86, so that incoming steam is forced to pass through orifice 94. On the other hand, material inlet 84 is oriented such that incoming liquified sludge material is directed into body 80 downstream of wall 86, and must pass through orifice 95. In this fashion, the hydroheater 16 is designed so that steam entering inlet 84 is caused to intersect with the stream to be processed as the latter passes through the orifice 95. By virtue of the confined nature of the hydroheater body 80, and the relative orientation of the walls 86, 88, the material to be processed is thereby subjected to elevated temperatures and pressures and very intense shear conditions within the hydroheater. Tubular wall 88 passes out of the end of body 80 as shown, and defines the output end 96 of the hydroheater 16. Therefore, material processed within the confined reaction zone of the hydroheater passes directly out through end 96.

Returning to FIG. 1, it will be seen that the processing assembly 18 includes an output delivery pipe 98 equipped with temperature and pressure gauges 100, 102 and back pressure gate valve 104. The end of pipe 98 remote from hydroheater 16 communicates with a blow down chamber 106. The latter has an overhead steam outlet pipe 108 extending from the upper end thereof, as well as a finished product line 110 extending from its lower end and having ball control valve 112 therein.

In the use of processing system 10, drained ink waste sludge is placed within vessel 20, and mixer 26 is activated. If necessary, a small quantity of water may be added to the vessel 20 as well. High speed mixing within the vessel 20 is initiated and continues until the sludge becomes flowable. At this point, material passes downwardly through pipe 38 for passage through pump 40 and recirculation through line 48. It will of course be appreciated that during this initial sequence that valves 46, 54 and 58 are closed, and valve 50 is open.

When the sludge becomes sufficiently fluidized through mixing and recirculation as described, valve 50 is closed and valve 54 is opened. This serves to direct the liquified sludge through line 52 for passage into hydroheater 16 via inlet 82. Simultaneously, high pressure steam is directed through line 64 (valves 68, 74 being open) to hydroheater 16 through steam inlet 84. In the hydroheater body 80, the liquified ink sludge is heated and subjected to increased temperatures and intense shearing action. This occurs primarily at the region of intersection between the material stream received through inlet 82, and the stream of steam from inlet 84. The processed output from the hydroheater 16 leaves via outlet 96 and is directed through pipe 98 to blow down chamber 106. In the chamber 106, excess steam is flashed off, and the final processed product is delivered through line 110 for collection.

As indicated previously, the processed output from line 110 can be partially dried and a high quality ink product made directly using this material. Alternately, the flowable output can be completely dried and reduced to a powder which can then be reconstituted as an ink.

Figure 3:
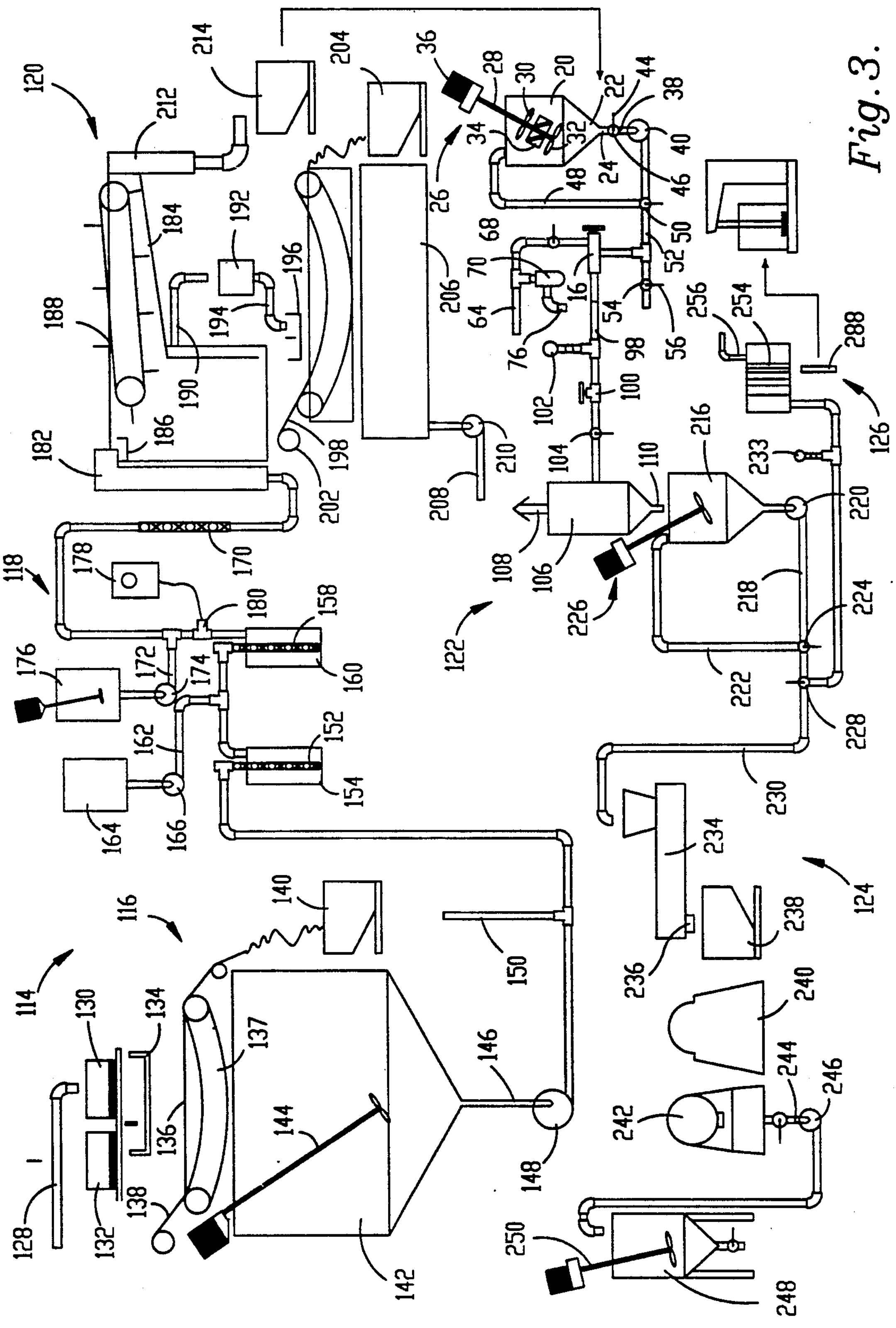
FIG. 3 is a schematic illustration of presently preferred in-plant apparatus for the processing and treatment of printing ink wastes.

FIG. 3 is a schematic illustration of preferred in-plant apparatus 114 useful in accordance with the invention. Broadly, the apparatus 114 includes a preliminary filtering and collecting assembly 116, a modifier addition system 118, a waste separation assembly 120, hydroheater conversion system 122 and alternate downstream processing assemblies, namely, drying system 124 and filter press system 126.

In more detail, in inlet pipe 128 is provided which conveys the incoming ink wastes, typically including indeterminate fractions of water, detergents, pigments and polymers. The precise makeup of these wastes will vary from day to day and from machine to machine. The incoming ink wastes are first filtered to remove large particles and extraneous matter such as paper. To this end, a pair of alternately usable filters 130, 132 are provided, each equipped with relatively large pore filter media, such as screen wire. The purpose of the filters 130, 132 is to remove the relatively large diameter contaminants from the incoming stream. The assembly 116 further includes a distribution box 134 having an apertured bottom which receives the throughput from filter 130 or 132 and distributes the same laterally for deposit onto underlying filter paper 136, the latter traversing arcuate, apertured tray 137 and being supplied from reel 138. The filter paper 136 would typically have a pore size of approximately 5 microns, although this is not critical; this filter paper serves to completely remove any remaining paper fibers from the incoming ink wastes. The used filter paper is collected in bin 140.

The fully filtered wastes then pass through tray 137 and are collected within vessel 142 equipped with stirrer 144. The vessel 142 serves as a surge tank for collection of sufficient quantities of filtered wastes to merit a production run. The output of vessel 142 communicates with pipe 146, the latter having a Moyno pump 148 interposed therein. An aeration pipe 150 also communicates with pipe 146 downstream of pump 148, with the pipe 150 being operatively coupled to the plant air compression system (not shown). As the filtered, collected wastes pass through the pipe 146, they are aerated in order to assist in downstream flotation separation.

The pipe 146 ultimately communicates with a static mixer 152, the latter being surrounded by a collection tank 154. The purpose of this arrangement is to complete the aeration of the wastes. The tank 154 is connected via pipe 156 to a second static mixer 158, the latter also being disposed within a collection tank 160. A first polymer injection line 162 communicates with pipe 156 between the mixers 152, 158. A conventional mixing/holding tank 164 is connected to line 162 as shown, and is designed for the mixing and holding of low molecular weight polymer. A Milton-Roy metering pump 166 is interposed in line 162 for accurate delivery of the low molecular weight polymer to the aerated waste stream. Thorough mixing of the low molecular weight polymer with the waste stream is assured by means of the secondary static mixer 158.

The output from tank 160 passes via line 168 into and through another in-line static mixer 170. A high molecular weight polymer injection pipe 172 communicates with the line 168 between tank 160 and static mixer 170. The pipe 172 has a Moyno metering pump 174 therein, and is connected with a mixing/holding tank 176. A pH monitor 178 is operatively connected through a conventional fitting 180 into line 168, for the purpose of continuously monitoring the pH of the process stream. This monitor also controls the operation of upstream low molecular weight polymer metering pump 166.

The output of line 168 downstream of in-line mixer 170 passes into an upright flocculation tank 182. The tank 182 is sized so that the polymer-supplemented ink wastes generate a large, easily separable floc before reaching the upper end of the tank. Tank 182 in turn communicates with an air flotation tank 184 equipped with a distribution box 186 and with an endless rake-off belt 188 adjacent the upper end thereof. As the flocculated material passes into tank 184, the solids fraction rises to the top of the tank whereas clear waste water settles to the bottom. This waste water is drawn off through outlet pipe 190, whereas the floc is skimmed by rake-off belt 188.

Considering first the waste water, it will be observed that the pipe 190 outputs to holding tank 192, the latter having output line 194 which delivers liquid to distributor 196. The waste water from the distributor 196 is filtered through filter paper 198 (20 micron) traversing arcuate filter support 200. The filter paper 198 is drawn from reel 202, and used filter paper is deposited in bin 204. The filtered water stream is ultimately collected in tank 206, and can be selectively conveyed through pipe 208 equipped with pump 210 back to the plant ink cleanup system or other suitable use.

The skimmed floc from tank 184 passes into collection tank 212, wherefrom it is delivered to a filter paper-lined (20 micron) dumpster 214 where the sludge is drained for a suitable period, e.g., 24 hours.

The drained sludge from dumpster 214 is conveyed by any suitable means to the hydroheater conversion system 122. This system is essentially identical with the apparatus described in FIG. 1, and therefore like reference numerals have been applied to these components for ease of understanding, and no further discussion of these components is therefore necessary.

As indicated previously, the apparatus 114 provides alternate downstream processing equipment for the hydroheater-converted ink wastes, namely drying system 124 and filter press system 126. Common to both of these downstream systems is a collection tank 216 adapted to receive the output from finished product line 110 as shown. A lower output line 218, having a Moyno pump 220 therein, extends from the conical bottom of the tank 216. A recirculation line 222 is connected with output line 218 for delivery of product back to the top of tank 216, this operation being controlled by means of valve 224. An electrical motor-driven mixer 226 is also provided with the collection tank 216 as shown.

A three-way valve 228 is operatively connected with output line 218 downstream of recirculation line 222. One valve output is connected with a drying system input line 230, whereas the other valve output is connected with a filter press input line 232 having pressure gauge 233 therein.

The drying system 124 preferably includes an auger dryer 234 adapted to receive the output from line 230. The purpose of auger dryer 234 is to powder the incoming liquid containing the converted ink wastes, and to this end, is designed to intermittently operate and heat the liquid, driving off moisture. The auger dryer 234 creates a chunk-type, dried product, which exits the auger dryer at 236 and enters hopper 238. As desired, the dried chunk product within hopper 238 can be subjected to treatment in hammermill 240, and subsequently reduction in ballmill 242. In the ballmill 242, appropriate amounts of water and acrylic polymer (e.g., Joncryl 61LV) are added with the hammermilled, converted wastes. The goal of this treatment is to reduce the dried product to a flowable 7.5-8 Hegman master grind for ink production.

The flowable output from the ballmill 242 passes through line 244 having a pump 246 therein to ink formulation tank 248 having mixer 250 therein. In the tank 248, various known "let-down" vehicles are added to the master grind. This forms a complete black ink which can be used in plant printing equipment.

The filter press system 126 includes any conventional filter press 252, for example an Ertel 12" diameter filter press. As those skilled in the art will appreciate, such a filter press is designed to accept a plurality of appropriately sized filter media sheets 254. The liquid from collection tank 216 is directed to the filter press 252 under pressure from pump 220, it being understood that valve 224 would be appropriately manipulated to maintain a constant pressure within the press 252 sufficient for deliquifying operations, but not so high as to overcome the capacity of the filter press. The pressed liquid fraction passes from filter press 252 by means of pipe 256, and this continues until all clear water has been exhausted and water flow stops; this indicates that the filter media 254 is completely full and an appropriate filter cake has formed in the filter press 252. This filter cake is schematically depicted at 258 in FIG. 3. In any event, the filter cake 258 is then subjected to further processing as desired in order to create a finished ink. For example, the cake 258 may be treated in a Cowles dissolver, which serves to reduce the cake to particulate form. Thereupon, the previously described ink carriers and let-down vehicles can be added to complete the ink formulation.

The following examples illustrate the methods of the invention. It is to be understood that these examples are presented by way of illustration only, and nothing therein should be construed as a limitation upon the overall scope of the invention.

EXAMPLE 1

Flexographic ink washup wastes collected from a number of flexographic printers are collected in a 4,000 gallon tank and subjected to flocculation to permit solids removal. The flocculation technique is entirely conventional, and involves first injecting a cationic polymer (Aquafloc #412, Dearborn Division, W. R. Grace Co., Lake Zurich, Ill.) to create a pin floc, followed by air injection and introduction of an anionic polymer (Aquafloc #407) to create a large floc which can be readily skimmed. The skimmed floc is then collected in a large dumpster lined with filter paper, and allowed to drain for approximately 24 hours, until the solids level is approximately 11-13% by weight.

The solids sludge is then loaded into the vessel 20 of liquification assembly 12. A small amount of water, e.g., 2-3 ounces, is placed in the vessel prior to loading with sludge. This assists in starting the sludge into the pump 40. The mixer 26 and pump 40 are then turned on, and the sludge begins to circulate. Circulation continues until a substantially homogeneous, liquified mixture is created.

During this sequence, the steam system 18 is turned on and allowed to pass through the hydroheater 16. Water from the steam and accumulation in the steam lines is extracted through the separator 70 to produce properly clean steam. The back pressure valve 104 is then slowly closed until a back pressure of 60 psi and a temperature of 310° F. is established. Steam is then allowed to continue blowing through the system without sludge being pumped, until the pressure and temperature stabilize. At this point, the waste sludge is diverted from assembly 12 to the hydroheater 16, and temperature and pressure levels are monitored to insure stability. The liquified waste is pumped at a rate of about ½ gallon per minute through the hydroheater 16. The output from the hydroheater is passed to blow down chamber 106 where excess steam is vented. The processed product passes through line 110 and is collected. If necessary, a paddle may be used in vessel 20 to insure that all sludge material passes through the system.

The solids level of the converted final product is not a major factor, but condensation values of the steam can greatly affect drying conditions. If the steam is dry, about 1-2% moisture is added. Excess moisture should be avoided inasmuch as this requires more energy in the drying phase.

Samples of the processed product are loaded into 9"×9" tin pans and placed in a drying oven set at a temperature of between 210°-230° F. The drying continues until the processed material is virtually completely dry, and the solids look like cracked, dry mud and exhibit a smooth texture.

The dried chips are then broken down into smaller pieces by hand, and loaded into a laboratory ball mill having a volume of 1.2 gallons. Ceramic stones are used as the grinding media with about a 3:1 stone:waste ratio being employed. The ball mill is closed and allowed to run overnight.

On the following day, the dry, powdered material is removed from the mill and classified through a Ro-Tap shaker sieve. This unit is run for about 30 minutes to insure complete segregation and classification of particles. Particles classified from about 125-180 microns are reloaded into the ball mill with grinding medium, along with conventional ink components. Specifically, the ball mill is charged with a mixture comprising 15% by weight of the dried, classified waste material, 60% by weight of an aqueous acrylic polymer designed for use in pigmented inks (Joncryl 130 sold by S. C. Johnson of Racine, Wis.), 20% by weight water and 5% of liquid anti-abrasion polyethylene wax emulsion (Jonwax 26, S. C. Johnson Racine, Wis.). The ball mill is again allowed to run overnight.

Upon opening the ball mill, 0.1% by weight of SAG-4130 defoamer is added, the lid replaced and the ball mill is run for about 1 minute. When reopened, the foam is dissipated and the contents of the mill dumped. The resultant ink exhibits good film forming qualities, and sticks to the white enamel of the catch pan. When rubbed between the fingers, the product settles in between the ridges of the fingerprints and dries into a film, exhibiting good gloss and no grit. Coverage tests are performed using a 200 screen wire wound rod, and the ink gives excellent coverage, gloss, rub resistance and black color.

EXAMPLE 2

This example illustrates use of a filter press system downstream of the hydroheater.

In this example, approximately 30 pounds of solids sludge recovered from the filter paper-lined dumpster described in Example 1 was used. This sludge was then converted in the hydroheater 16 exactly as described in Example 1, and the converted output was collected in pails and allowed to cool. After cooling, the material was poured back into mixing vessel 20, whereupon it was pumped into an Ertel 12" filter press equipped with three spaced apart 12" filter pads. Line pressure was approximately 40 psi. This process was continued until clear water stopped coming from the filter press liquid output. The press was then opened and a filter cake was extracted. This cake had an average solids content of 35% by weight.

The recovered filter cake was then processed into a black ink. This involved first reducing the cake in a Cowles dissolver (Cowles Model 25) for about 10 minutes to produce a fine particulate. At this point, a mixture made up of 50% by weight cake solids, 25% by weight Joncryl 61LV and 25% by weight of commercial letdown vehicle (KF-11161, Acme Ink, Kansas City, Mo.) was prepared, with mixing for about 10 minutes. This yielded an excellent quality black ink.

We claim:

1. A method of recovering printing ink wastes, comprising the steps of:

providing a flowable stream of material including printing ink wastes;

directing said flowable stream into a confined zone while simultaneously passing a stream of steam into said zone;

subjecting said flowable stream to conditions of elevated temperature and pressure and intense shear by contacting said flowable stream with said steam in said zone, to thereby create processed ink wastes; and passing said processed ink wastes out of said zone.

2. The method of claim 1, said material stream-providing step comprising the steps of:

obtaining a quantity of printing ink washup waste;

separating a substantial fraction of a solids fraction of said washup waste to form a sludge; and agitating said sludge to form said flowable stream.

3. The method of claim 2, said sludge having from about 10–20% solids therein.

4. The method of claim i, said printing ink wastes being derived from flexographic or lithographic ink washup wastes.

5. The method of claim 1, said zone comprising a hydroheater having respective inlets for said flowable stream and a stream of steam.

6. The method of claim 5, said subjecting step comprising the steps of directing said flowable stream through a restricted annular orifice with said confined zone, and passing said stream of steam in said confined zone at a location to intersect said flowable stream as it passes through said restricted annular orifice.

7. The method of claim 1, said flowable stream being subjected to a temperature of at least about 300° F. and a pressure of at least 60 psi in said confined zone.

8. The method of claim 7, said temperature being from about 300°–360° F., and said pressure being from about 60–75 psi.

9. The method of claim 1, including the step of drying said processed ink wastes after passage thereof from said zone.

10. The method of claim 9, including the step of reducing said dried processed ink wastes to a powder.

11. The method of claim 10, said powder having an average particle size of from about 100–400 microns.

12. The method of claim 11, including the step of mixing said powder with ink carriers to form a printing ink.

13. Dried, processed ink wastes made in accordance with the method of claim 9.

14. Processed ink wastes made in accordance with the method of claim 1.

15. The method of claim 1, including the step of passing said processed ink wastes through a filter press to remove at least a portion of liquid therefrom and to form a filter cake.

16. The method of claim 15, including the step of subdividing said filter cake and mixing said subdivided filter cake with ink carriers to form a printing ink.

* * * * *